Jan. 21, 1969     W. POLLAK     3,422,572
VEHICLE BODY CLOSURE OPERATOR
Filed Sept. 21, 1966     Sheet 1 of 2

INVENTOR.
Walter Pollak
BY
D. L. Ellis
ATTORNEY

Jan. 21, 1969    W. POLLAK    3,422,572

VEHICLE BODY CLOSURE OPERATOR

Filed Sept. 21, 1966    Sheet 2 of 2

INVENTOR.
Walter Pollak
BY
D. L. Ellis
ATTORNEY

United States Patent Office 3,422,572
Patented Jan. 21, 1969

3,422,572
VEHICLE BODY CLOSURE OPERATOR
Walter Pollak, Detroit, Mich., assignor to General
Motors Corporation, Detroit, Mich., a corporation
of Delaware
Filed Sept. 21, 1966, Ser. No. 580,991
U.S. Cl. 49—280                                       7 Claims
Int. Cl. E05f 15/00; B60j 5/10

ABSTRACT OF THE DISCLOSURE

A closure operating arrangement for the tailgate of a stationwagon style vehicle body includes linkage connected between the body and the tailgate for effecting movement of the latter between fully open and fully closed positions, a combined latch and pull-close member mounted on the body for movement to an extended position engageable with a striker on the tailgate in a partially open position of the latter and movable to a retracted position pulling the tailgate fully closed, with a power-operated drive unit being mounted on the body and arranged to drive the linkage simultaneously with a cam and cam follower connected with the combined latch and pull-close member and operable in timed relation with the linkage to cause such member to intercept the tailgate during its movement from fully open to partially open position and thereafter assist the linkage means in moving the tailgate to fully closed position. The cam means further coordinates the combined latch and pull-close member with the linkage for initial unlatching movement in the opening cycle of the tailgate, and independent manually operable means are provided for selective unlatching of the combined latch and pull-close member independently of operation of the drive unit.

---

This invention relates to vehicle body closures and more particularly to vehicle body closure operating arrangements.

This invention provides a new and improved vehicle body closure operating arrangement including power operated or driven moving means for moving the closure between fully open and fully closed positions relative to the vehicle body, and high output pull-close means operative upon movement of the closure from its fully open position to an intermediate partially open position, wherein it encounters the resistance of a compressible seal strip, to assist the moving means in completing the movement of the closure to its fully closed position against the resilient reaction of the seal strip. In addition to the closing assist function, the pull-close means are operative to serve as latching means for releasably holding the closure in its fully closed position. The various functions of the operating arrangement are coordinated by cam means which are interconnected for simultaneous operation with the driven moving means and connected with the pull-close means for operation of the close assist and latching functions thereof in proper timed relation with the cycling of the moving means between the fully open and fully closed positions of the closure.

The primary object of this invention is to provide a new and improved vehicle body closure operating arrangement including moving means for moving the closure between fully open and fully closed positions, pull-close means for assisting the moving means in moving the closure means from intermediate partially open to fully closed positions, and cam means operatively interconnected between the moving means and the pull-close means for operating the pull-close means in proper timed relation with operation of the moving means.

Another object of this invention is to provide a new and improved vehicle body closure operating arrangement according to the foregoing wherein the pull-close means further serve as latching means for holding the closure in the fully closed position thereof.

A further object of this invention is to provide a new and improved vehicle body closure operating arrangement according to the foregoing objects wherein the combined pull-close and latch means are comprised of a single member or bolt movable in timed relation with the closure between an extended position engageable with an associated striker in the partially open position of the closure to a retracted position pulling the closure to fully closed position and holding it therein, the bolt being further movable either by the cam means or by independent manual operating means to an unlatching position out of engagement with the striker permitting opening movement of the closure either manually or by timed operation of the moving means.

These and other objects, features and advantages of the invention will be readily apparent from the following specification and the drawings wherein.

Figure 1:
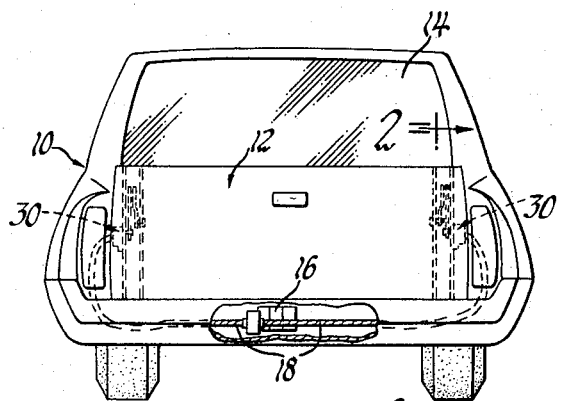
FIGURE 1 is a partially broken away rear elevational view of a station wagon style vehicle body including a vehicle body closure operating arrangement according to the invention.

Referring now particularly to FIGURE 1 of the drawings, the vehicle body closure operating arrangement of the invention is shown incorporated in a station wagon style vehicle body designated generally as 10. The body includes a rear tailgate opening, the lower portion of which is adapted to be closed by a tailgate 12 hinged adjacent its lower edge by conventional hinge means, not shown, for movement between a fully closed position as shown and a fully open position, not shown, wherein the tailgate is disposed in generally horizontal position. The upper portion of the tailgate opening is closed by a tailgate window 14 of conventional character movable between closed position as shown and a fully open position received within the tailgate.

As specifically disclosed herein, the closure operating arrangement embodies a pair of spaced operating assemblies each adjacent a respective jamb interface between the tailgate and body 10, these assemblies being interconnected for simultaneous operation by a suitable reversible electric motor drive assembly 16 and a pair of flexible drive cables 18. Since the two operating assemblies are identical except as to hand, only the right-hand assembly will be particularly described.

Figure 2:
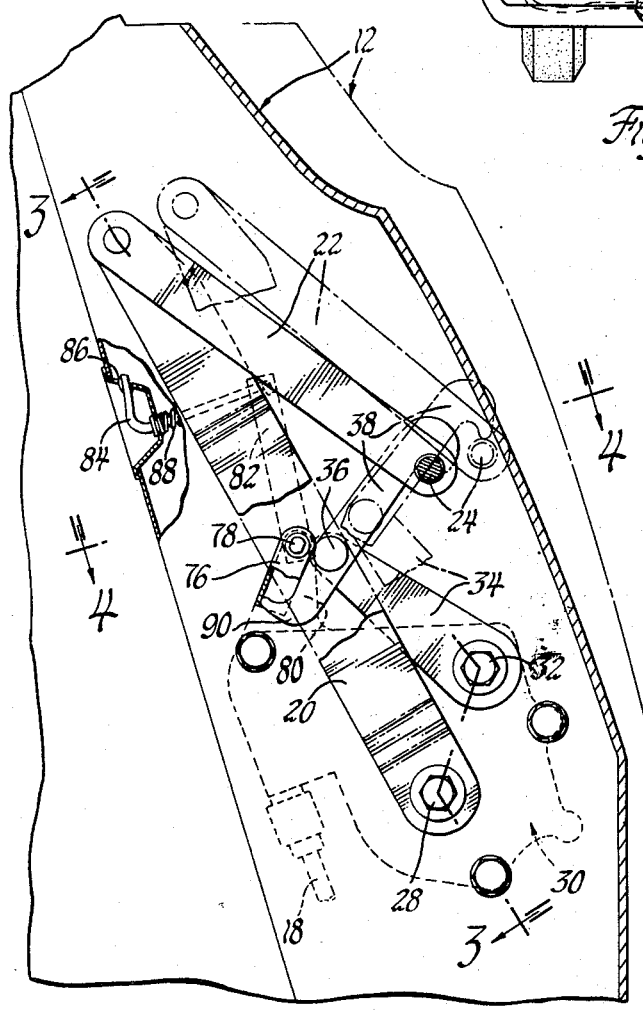
FIGURE 2 is an enlarged partially broken away view taken generally along the plane indicated by the line 2—2 of FIGURE 1, the tailgate of the vehicle body being shown in fully closed and partially open positions in solid and broken lines respectively.
Figure 4:
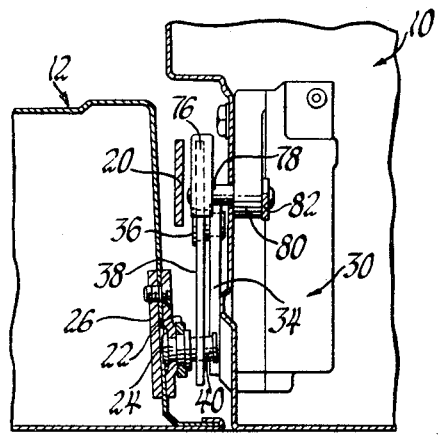
FIGURE 4 is a sectional view taken generally along the plane indicated by the lines 4—4 of FIGURE 2.
Figure 5:
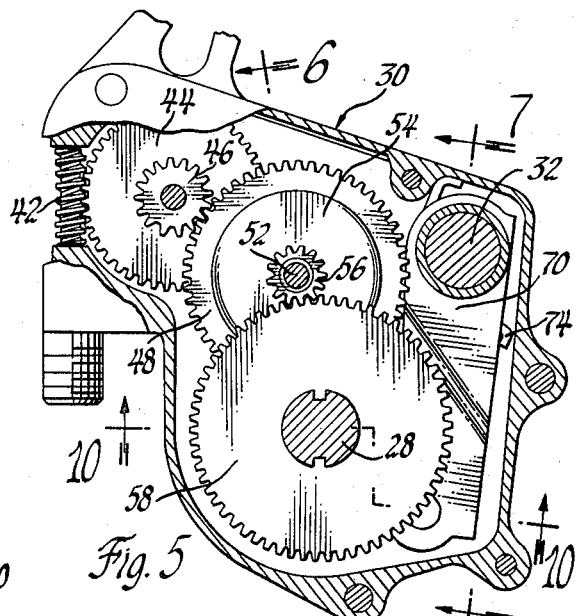
FIGURE 5 is a partially broken away view of the reduction gear drive and cam unit of the closure operating arrangement.

Referring to FIGURE 2, a moving means or folding linkage for the tailgate includes a link 20 rotatable about one end relative to the jamb wall of the body 10 in a manner hereinafter described and pivotally connected at its other end with one end of a second link 22 pivotally mounted at its other end to a pin 24 extending from the outer portion of a mounting plate assembly 26 secured to the jamb wall of tailgate 12, FIGURE 4. Links 20 and 22 move from a fully folded position in the fully closed position of the tailgate shown to a generally unfolded position, not shown, in the fully open position of the tailgate.

Figure 3:
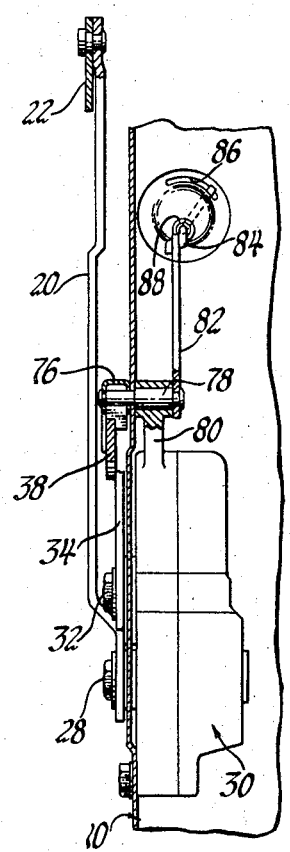
FIGURE 3 is a sectional view taken generally along the plane indicated by the line 3—3 of FIGURE 2.

As seen in FIGURES 2 and 3, the lower end of link 20 is nonrotatably secured to a first output shaft 28 of a reduction gear drive and cam unit 30 which has its housing bolted or otherwise secured against the interior face of the jamb wall of the body 10. A second output shaft 32 of reduction unit 30 nonrotatably mounts an actuating arm 34 having mounted on its free end by a stud 36 a combined pull-close and latch bolt member 38. Bolt 38 and arm 34 are oscillatable as a unit by shaft 32 between a retracted position as shown in full lines in FIGURE 2, to an extended position, shown in broken lines. In addition to this oscillation, bolt 38 is pivotable in a manner hereinafter explained about stud 36 between a latching condition in engagement with a striker extension 40 of pin 24 and an unlatched condition, again indicated in solid and broken lines respectively in FIGURE 2.

Referring now to FIGURES 5 through 10 inclusive, reduction unit 30 includes a rotatable worm 42 suitably operatively connected with a respective flexible cable 18, and in mesh with a worm wheel 44 carrying a pinion 46. Pinion 46 meshes with a gear 48 nonrotatably received on a hub portion of a gear 50 which is journalled on one reduced end portion of a shaft 52, FIGURE 6. The opposite reduced end portion of shaft 52 journals the hub portion of a clutch drum 54, there being nonrotatably mounted on such hub portion a pinion 56. As seen best in FIGURE 5, pinion 56 meshes with an output gear 58 splined or otherwise nonrotatably mounted on an end portion of output shaft 28.

Figures 6, 7:
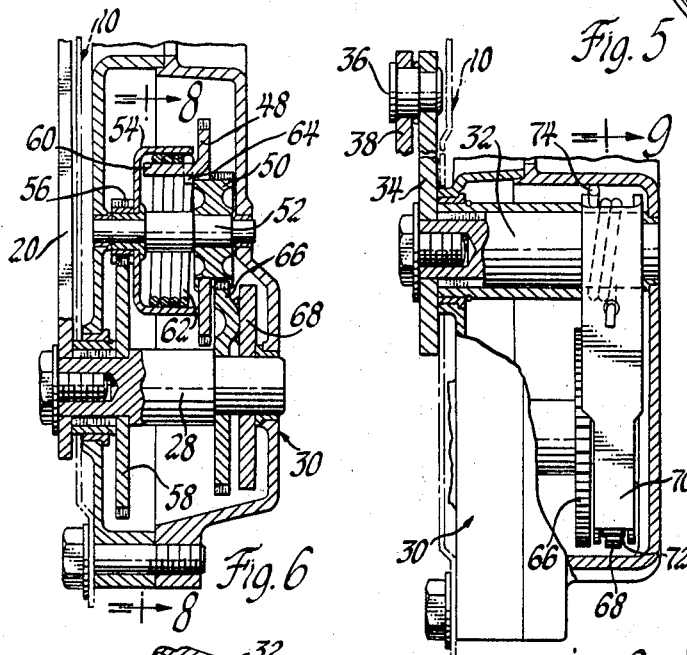
FIGURE 6 is a sectional view taken generally along the plane indicated by the lines 6—6 of FIGURE 5.
FIGURE 7 is a partial sectional view taken generally along the plane indicated by the lines 7—7 of FIGURE 5.
Figure 8:
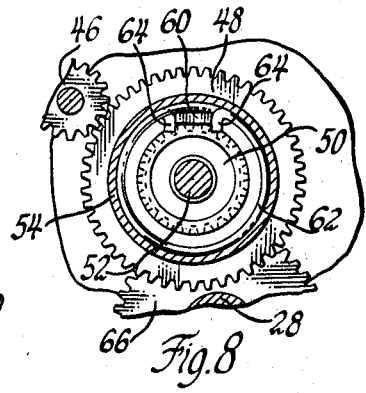
FIGURE 8 is a sectional view taken generally along the plane indicated by the lines 8—8 of FIGURE 6.

As seen best in FIGURES 6 and 8, gear 48 is provided with a laterally bent tongue 60 received between the two inwardly turned ends 64 of a coil spring 62 nested within clutch drum 54. The spring 62 is sized and assembled within the clutch drum 54 with a degree of frictional engagement therewith such that when tongue 60 of gear 48 rotates in either direction, the spring will grip and expand into yet tighter frictional engagement with the drum to establish driving connection between gear 48 and pinion 56.

Figure 9:
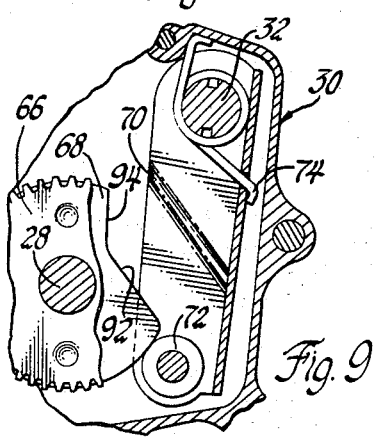
FIGURE 9 is a sectional view taken generally along the plane indicated by the lines 9—9 of FIGURE 7.

Referring to FIGURES 6, 7 and 9, the toothed portion of gear 50 meshes with a gear 66 rotatably mounted on the other reduced end of output shaft 28, gear 66 having welded or otherwise secured thereto a cam 68 also rotatable on shaft 28. Cam 68 is engaged by a roller 72 mounted within one end of a generally U-shaped cam lever 70 which has its other end splined or otherwise nonrotatably secured to output shaft 32. A coil torsion spring 74 received about shaft 32 has one end hooked to cam lever 70 and is restrained at its other end by the housing of reduction unit 30 in a manner to bias the cam lever clockwise as viewed in FIGURE 9, for constant engagement of the roller 72 on the periphery of the cam 68.

Referring now to FIGURES 2 and 3, manual operating means for selectively releasing bolt 38 from striker 40 includes a generally U-shaped arm 76 nonrotatably secured to a reduced end of a stud 78 journalled in a support extension 80 of the housing of reduction unit 30. Stud 78 has further nonrotatably mounted thereto a lever 82 connected with a release member 84 having one bent arm portion thereof rotatable in a slot 86 formed in an escutcheon in the tailgate inner panel. A coil compression spring 88 is interposed between the escutcheon and lever 82 to bias the lever and arm 76 to an inoperative position as shown. To release bolt 38 from striker 40, release member 84 is rotated counterclockwise as viewed in FIGURE 3, out of slot 86 and subsequently pulled to rotate lever 82 and arm 76 counterclockwise, FIGURE 2, to have the arm 76 act on a nose 90 of bolt 38 to rotate the bolt counterclockwise out of engagement with striker 40.

Figure 10:
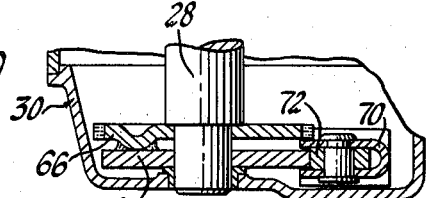
FIGURE 10 is a sectional view taken generally along the plane indicated by the lines 10—10 of FIGURE 5.

For reasons hereinafter explained, the gearing in reduction unit 30 is preferably such that cam 68 undergoes exactly three or more revolutions for each of the two portions of the cycle of shaft 28 moving the tailgate 12 from fully closed to fully open positions, and from fully open to fully closed positions. Referring to FIGURES 2 and 10 and assuming the tailgate to be initially in fully closed position, the roller 72 is engaged on a full radius portion of cam 68 generally in the position shown in FIGURE 10. To open the tailgate, the drive assembly 16 is energized in the proper direction to rotate shaft 28 and link 20 clockwise as viewed in FIGURE 2, cam 68 being simultaneous rotated clockwise to allow roller 72 to enter a contour lobe 92 thereof whereby the cam lever 70 is rotated clockwise by the spring 74. Actuating arm 34 is similarly rotated clockwise to move the bolt 38 from retracted to extended position. When moving to extended position, the nose 90 of bolt 38 rides along arm 76 until it engages the stud 78 whereby the bolt is caused to pivot on arm 34 counterclockwise to unlatched position as shown, out of engagement with the striker 40. The unfolding movement of links 20 and 22 continues to the fully open position of the tailgate, roller 72 in the meantime having entered another contour lobe 94 of cam 68 causing retracting movement of bolt 38. Due to the aforenoted plurality of cycles of cam 68, there is a consequent plurality of further oscillations of bolt 38 between extended and retracted positions while the tailgate is being moved to fully open position.

In the reverse sequence for moving the tailgate from fully open to fully closed positions, the drive assembly 16 is energized in proper direction to cause folding movement of links 20 and 22 until they and the tailgate reach generally the broken line position of FIGURE 2. This position corresponds to the position of the tailgate at which its marginal edge portions engage the usual seal strip, not shown, mounted on body 10 about the tailgate opening. Should the torque in shaft 28 and links 20 and 22 be insufficient to compress this seal strip and move the tailgate fully closed, additional pull-close force is available from bolt 38. During the closing movement of tailgate to the broken line partially open position of FIGURE 2, cam 68 has completed one or more counterclockwise revolutions to the point generally wherein roller 72 of cam lever 70 has traversed contour lobe 94 or cam 68 to permit movement of bolt 38 to extended and unlatched position as shown in broken lines. Subsequent rotation of the cam introduces roller 72 into lobe 92 whereby to rotate actuating arm 34 counterclockwise moving nose 90 of bolt 38 away from stud 78 and permitting the bolt to fall to latched position over striker 40. The mechanical advantage arising from the contour lobe 92 and the lever arms of cam lever 70 and actuating arm 34 is sufficient to move the bolt 38 to its retracted position and pull the tailgate 12 fully closed, even against the reaction of the compressible seal strip. By virtue of the irreversibility in the gearing of reduction unit 30, the actuating arm 34 and bolt 38 will remain in retracted position when the drive assembly 16 is shut off and accordingly latches the tailgate in the fully closed position.

As mentioned, bolt 38 may be manually released from striker 40 by release member 84 to permit manual movement of the tailgate between its positions. Such manual movement is not resisted in reduction unit 30 since the coil spring 62 is not operative to clutch the clutch drum 54 and the gear 48 together when the input rotation is applied to the clutch drum as in the case of such manual movement of the tailgate.

As also previously mentioned, the cam 68 preferably undergoes an exact number of revolutions while the output shaft 28 undergoes each opening and closing portion of its cycle whereby the movement of links 20 and 22 and bolt 38 will always be in phase. This phase relationship may be maintained when the tailgate is manually moved to a portion or all of its cycle by an arrangement of limit switches preventing operation of the drive assembly 16 in well known manner until the tailgate is in either fully closed or fully open position. However, the need for such a limit switch arrangement is avoided by the structure disclosed herein, specifically the use of a slip clutch as comprised by spring 62 and clutch drum 54. The clutching between these members is preferably set to fail or slip when the resistance encountered in links 20 and 22 and output shaft 28 reaches a predetermined value corresponding to the reaction obtaining from the compressible seal strip on the body 10. For example, even if cam 68 is out of proper phase with links 20 and 22 during the movement of tailgate 12 from fully open to partially open positions, the clutching between spring 62 and drum 54 is set to slip when the tailgate encounters the resistance of the seal strip. The motion of tailgate 12 is briefly halted until the still rotating cam 68 comes into proper phase to move the bolt 38 to extended position and subsequently pull the tailgate 12 to fully closed position.

Having thus described the invention, what is claimed is:

1. In a vehicle body including a closure member movable between fully open and fully closed positions relative to a body member, the combination comprising: means for moving said closure member between the fully closed and fully open positions thereof; pull-close means operative to assist said moving means in moving said closure member from an intermediate partially open position thereof to said fully closed position thereof; and power operated drive unit means including output drive means connected to said moving means for operation of the latter, cam means, means operatively connecting said cam means and said output drive means for coordinated simultaneous operation of said cam means at all times with said output drive means, and follower means interconnecting said pull-close means and said cam means for timed operation of said pull-close means upon movement of said closure member from said fully open to said partially open position thereof by said moving means to thereafter apply with said moving means simultaneous closing movement to said closure member to the fully closed position thereof.

2. Apparatus as recited in claim 1 wherein said pull-close means are comprised of a combined latch and pull-close member movably mounted on one of said body or closure members and striker means on the other thereof, said combined latch and pull-close member being movable relative to said one member between an extended position engageable with said striker means in the partially closed position of said closure member and a retracted position, said cam means moving said combined latch and pull-close member from said extended to said retracted position thereof to move said closure member from the partially open to the fully closed position thereof, and means operable independently of said cam means for moving said combined latch and pull-close member from said retracted position thereof to an unlatched position released from said striker means.

3. The combination recited in claim 1 wherein said drive unit means includes support means on one of said body and closure members, said output drive means including first driven shaft means rotatably mounted on said support means, said cam means including a cam member rotatably mounted on said support means by second shaft means, said cam member and said first shaft means being operatively interconnected by reduction gear means.

4. The comination recited in claim 3 wherein said reduction gear means includes slip clutch means permitting rotation of one of said cam and said first shaft means independently of the other.

5. The combination recited in claim 3 further wherein the means interconnecting said cam means and said combined latch and pull-close member includes lever means fulcrumed on said support means and having one end portion thereof engaging the contour of said cam member, and means pivotally mounting said combined latch and pull-close member on another end portion of said lever means for movement as a unit therewith between extended and retracted positions and pivotal movement relative thereto between latched and unlatched positions.

6. The combination recited in claim 5 further including manual operating means operable independently of said cam means for pivotally moving said combined latch and pull-close member from the latched to the unlatched position thereof relative to said lever means.

7. The combination recited in claim 6 wherein said manual operating means includes a release member, and means operatively connecting said release member to said combined latch and pull-close member in a manner to cause the latter to pivot relative to said lever means between latched and unlatched positions during said unitary movement therewith between said extended and retracted positions thereof.

References Cited

UNITED STATES PATENTS

| 2,833,536 | 5/1958 | Joachim et al. | 49—280 X |
| 3,081,078 | 3/1963 | Lohr | 49—280 X |
| 3,145,988 | 8/1964 | Colautti et al. | 49—280 |
| 3,318,049 | 5/1967 | Arlauskas | 49—280 |
| 3,343,303 | 9/1967 | Wanlass | 49—280 |

DAVID J. WILLIAMOWSKY, *Primary Examiner.*

J. KARL BELL, *Assistant Examiner.*

U.S. Cl. X.R.

49—300, 340